United States Patent
Wilkinson

(10) Patent No.: US 12,164,637 B2
(45) Date of Patent: Dec. 10, 2024

(54) HARDWARE AUTOLOADER

(71) Applicant: Graphcore Limited, Bristol (GB)

(72) Inventor: Daniel John Pelham Wilkinson, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 59 days.

(21) Appl. No.: 17/338,942

(22) Filed: Jun. 4, 2021

(65) Prior Publication Data

US 2022/0019668 A1    Jan. 20, 2022

(30) Foreign Application Priority Data

Jul. 14, 2020    (GB) ...................................... 2010816

(51) Int. Cl.
  *G06F 21/57*    (2013.01)
  *G06F 9/38*    (2018.01)

(52) U.S. Cl.
  CPC .......... *G06F 21/572* (2013.01); *G06F 9/3802* (2013.01); *G06F 2221/033* (2013.01)

(58) Field of Classification Search
  CPC . G06F 21/572; G06F 9/3802; G06F 2221/033
  See application file for complete search history.

(56) References Cited

U.S. PATENT DOCUMENTS

| | | | |
|---|---|---|---|
| 2002/0138156 A1* | 9/2002 | Wong | G06F 9/4405 700/8 |
| 2003/0009334 A1* | 1/2003 | Printz | G10L 15/285 704/E15.048 |
| 2005/0132217 A1 | 6/2005 | Srinivasan et al. | |

(Continued)

FOREIGN PATENT DOCUMENTS

| | | |
|---|---|---|
| JP | 2010-073193 A | 4/2010 |
| KR | 101849708 B1 | 4/2018 |
| WO | 0127753 A2 | 4/2001 |

OTHER PUBLICATIONS

Combined Search and Examination Report dated Nov. 26, 2020 for United Kingdom Patent Application No. GB2010816.3. 6 pages.
(Continued)

*Primary Examiner* — Hyun Soo Kim

(74) *Attorney, Agent, or Firm* — HAYNES AND BOONE, LLP

(57) ABSTRACT

A new apparatus and method for securely distributing an application to processors of a processing unit. The processing unit is formed as part of an integrated circuit and comprises a plurality of processors (referred to as tiles), each having their own execution unit and storage for storing application data and additional executable instructions. The integrated circuit comprises a hardware module (referred to herein as the autoloader) that is configured to distribute a set of bootloader instructions (referred to herein as a secondary bootloader) to each of at least some of the tiles. Each of the tiles then executes instructions of the received secondary bootloader, which causes each tile to issue read requests to read a set of executable application instructions from a memory external to the integrated circuit. Each tile then performs operations using the received set of executable application instructions so as execute the application using the processing unit.

22 Claims, 12 Drawing Sheets

(56) References Cited

U.S. PATENT DOCUMENTS

| | | | |
|---|---|---|---|
| 2006/0168435 A1 | 7/2006 | Svensson | |
| 2009/0177856 A1* | 7/2009 | Herne | G06F 11/1464 |
| | | | 711/E12.001 |
| 2010/0287424 A1* | 11/2010 | Kwon | G06F 9/4401 |
| | | | 711/147 |
| 2012/0011354 A1 | 1/2012 | Owen | |
| 2014/0058532 A1* | 2/2014 | Das | G05B 19/0426 |
| | | | 700/1 |
| 2015/0067219 A1* | 3/2015 | Henry | G06F 13/42 |
| | | | 710/268 |
| 2015/0339129 A1* | 11/2015 | Divakaran | G06F 9/4405 |
| | | | 713/2 |
| 2016/0132369 A1* | 5/2016 | Lee | G06F 1/329 |
| | | | 713/323 |
| 2016/0196193 A1* | 7/2016 | Gschwind | G06F 3/0619 |
| | | | 714/16 |
| 2017/0083707 A1 | 3/2017 | Woolley | |
| 2021/0089469 A1* | 3/2021 | Zhu | G06F 13/4027 |
| 2021/0109766 A1* | 4/2021 | Liu | G06F 13/4282 |

OTHER PUBLICATIONS

International Search Report and Written Opinion dated Jul. 26, 2021 for Application No. PCT/EP2021/062334.
Office Action dated Jan. 9, 2024 for Japanese Application No. 2023-501865.

* cited by examiner

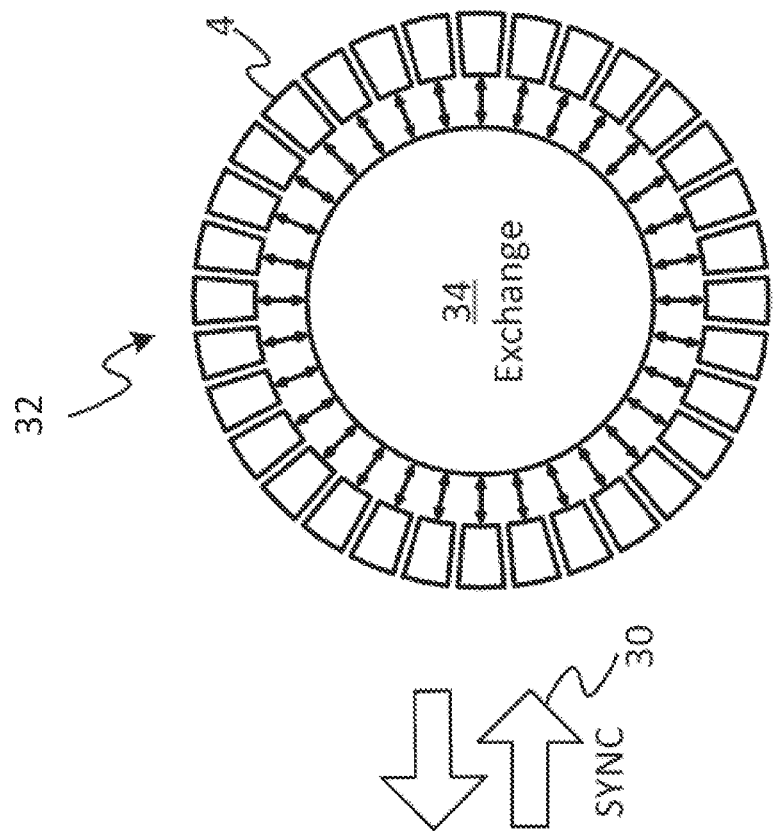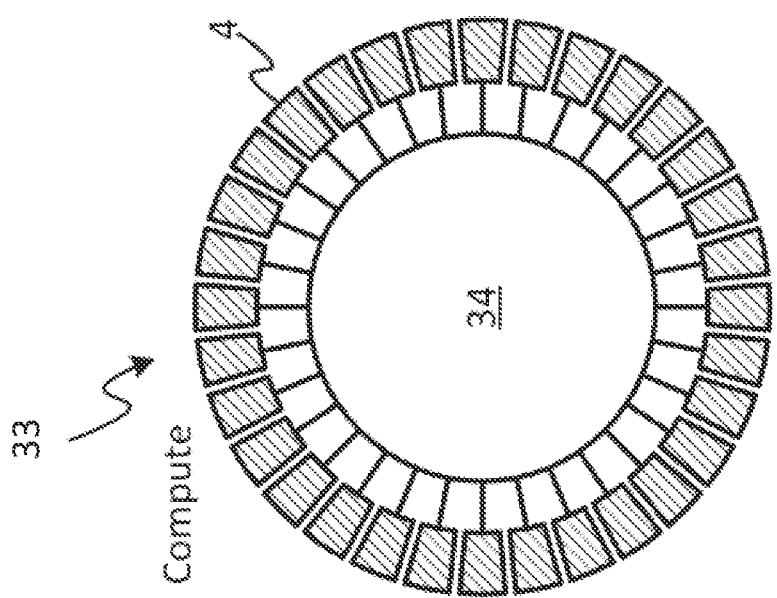
Fig. 2

HARDWARE AUTOLOADER

CROSS-REFERENCE TO RELATED APPLICATIONS

The present application claims priority to United Kingdom Patent Application No. 2010816.3, filed on Jul. 14, 2020, the disclosure of which is incorporated herein in its entirety.

TECHNICAL FIELD

The present disclosure relates to providing an application to a plurality of processors of an integrated circuit.

BACKGROUND

When performing large scale parallel operations, a processing unit comprising multiple processors may be provided on a single integrated circuit (i.e. a chip). Each of the processors is configured to perform operations for an application by executing a set of executable application instructions using a set of application data, e.g. the input variables for the application.

One example of the use of a processing unit comprising multiple processors is found in the context of machine learning algorithms, for example, in the context of deep neural networks. As will be familiar to those skilled in the art of machine intelligence, a machine intelligence algorithm is based on a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, i.e. weights and biases.

Typically, at least some of the processing of each node can be carried out independently of some or all others of the nodes in the graph, and therefore large graphs expose great opportunities for concurrency and/or parallelism. Each processor in a computer can be used to perform processing associated with a different node. In this way, a plurality of processors may collectively be used to train or operate a single neural network.

The processing associated with a machine learning model can be divided into an operating phase and a training phase. During the training phase, sets of input data are processed using data defining the state of a machine learning model to produce output values for the machine learning model. The data defining the state of the machine learning model includes information indicated which nodes of the model are connected and additionally the model parameters—including for example weights and biases—that vary during training. The sets of output values obtained during training are compared to sets of labels and the model parameters are updated so as to tune the model to more accurately reproduce the labels from the sets of input values. Once a machine learning model has been trained, a set of input data is processed during the operating phase to produce output values using the tuned parameters obtained during training.

The different sets of data—i.e. input data, information defining connections between nodes, model parameters, and labels—that are used during the operating and training phases for a machine learning model constitute application data that is processed by the one or more processors to perform the training and/or operating of a machine learning model. A set of executable instructions must be loaded into the multi-processor system to perform operations using this application data. Loading the set of executable instructions into the multi-processor system, whilst being a requirement that arises in a machine learning context, is not limited to this context and may arise in the context of other types of application.

SUMMARY

When loading a set of executable instructions into a multi-processor integrated circuit, one challenge is to prevent untrusted instructions and data from being loaded into each of the processors. If a malicious third party were to gain access to the storage of each processor, they may be able to install software into the processors, allowing them to gain access to genuine application data provided to the processors by tenants. The genuine application instructions and data are, in many cases, confidential and should be kept secret from malicious third parties. Therefore, there is a need for ensuring that only the trusted application instructions are moved from external storage into the memory of each of the processors.

According to a first aspect, there is provided an integrated circuit comprising a plurality of processors, each of the plurality of processors comprising: at least one memory for storing application data and a set of executable application instructions; and at least one execution unit, wherein the integrated circuit comprises a hardware module comprising memory comprising a set of executable boot instructions, wherein the hardware module comprises processing circuitry configured to cause the set of executable boot instructions to be dispatched over an interconnect of the integrated circuit to at least some of the plurality of processors, wherein for each of the at least some of the plurality of processors, the respective at least one execution unit is configured to: execute the received set of executable boot instructions to cause read requests to be issued to at least one memory external to the integrated circuit to fetch the set of executable application instructions; and execute the set of executable application instructions to perform operations using the application data.

The multi-processor integrated circuit is provided with a hardware module that is configured by trusted software to provide a bootloader to each of a set of processors. By doing so, each of the processors is securely provided with a trusted bootloader. The trusted bootloader is used to ensure that each of the processors issues read requests to the external memory locations storing the correct application instructions. This thereby prevents the processors reading incorrect instructions, which could be software provided by a malicious third party. Therefore, the security of the integrated circuit is improved. Additionally, this technique has the advantage that a fast booting of the application is achieved.

In some embodiments, for each of the at least some of the plurality of processors: executing the received set of executable boot instructions comprising calculating an address of the external memory in dependence upon an identifier of the respective processor in the integrated circuit, the causing the read requests to be issued comprises causing the read requests to be issued to fetch the set of executable application instructions from the calculated address in the external memory.

In some embodiments, the hardware module comprises processing circuitry configured to cause one or more write requests to be dispatched to each of the at least some of the plurality of processors to cause memory space not occupied by the set of executable boot instructions to be cleared.

In some embodiments, for each of the at least some of the plurality of processors: the respective at least one execution unit is arranged to cause checkpoint data generated during execution of the respective set of executable instructions to be dispatched in write requests to a storage external to the integrated circuit.

In some embodiments, the processing circuitry of the hardware module is configured to, following the causing the generated checkpoint data to be dispatched, cause the set of executable boot instructions to again be dispatched over an interconnect of the integrated circuit to at least some of the plurality of processors, wherein for each of the at least some of the plurality of processors, the respective at least one execution unit is configured to subsequently: execute the received set of executable boot instructions to cause read requests to be issued to the memory external to the integrated circuit to fetch the set of executable application instructions and a further set of application data including the checkpoint data; and execute the set of executable application instructions to perform operations using values of the checkpoint data.

In some embodiments, the further set of application data comprises a set of invariant data, wherein the invariant data is part of the application data fetched prior to dispatch of the checkpoint data, wherein the further set of application data comprises the checkpoint data in place of variant data that is part of the application data fetched prior to dispatch of the checkpoint data.

In some embodiments, for each of the at least some of the plurality of processors, the respective at least one execution unit is configured to execute the respective set of executable application instructions to load at least part of the application data from the at least one memory external to the integrated circuit.

In some embodiments, for each of the at least some of the plurality of processors, the respective at least one execution unit is configured to execute the received set of executable boot instructions to cause read requests to be issued to at least one memory external to the integrated circuit to fetch at least part of the application data.

In some embodiments, the hardware module comprises a volatile memory configured to store the set of executable boot instructions, wherein the processing circuitry of the hardware module is configured to, following a reset of the integrated circuit: receive the set of executable boot instructions from a device external to the integrated circuit; and store the received set of executable boot instructions in the volatile memory.

In some embodiments, receiving the set of executable boot instructions from a device external to the integrated circuit comprises receiving the set of executable boot instructions via a JTAG interface.

In some embodiments, the hardware module comprises a non-volatile memory configured to store the set of executable boot instructions.

In some embodiments, the memory of the hardware module is configured to store a plurality of sets of executable boot instructions, wherein the processing circuitry is configured to cause each of the plurality of sets of executable boot instruction to be dispatched to a subset of the processors of the integrated circuit.

According to a second aspect, there is provided a data processing system comprising: an integrated circuit according to the first aspect; and a data provision system comprising the memory external to the integrated circuit.

In some embodiments, the data provision system comprises at least one processor configured to, in response to receipt at the data provision system of a sync request from the integrated circuit, cause application data for a group of the processors to be loaded into the memory external to the integrated circuit.

In some embodiments, the at least one processor of the data provision system is configured to, arrange the application data in the memory external to the integrated circuit in an arrangement depending upon an identifier of the group of the processors received from the integrated circuit.

According to a third aspect, there is provided a method implemented in an integrated circuit comprising a plurality of processors, the method comprising storing in a hardware module of the integrated circuit, a set of executable boot instructions, causing the set of executable boot instructions to be dispatched over an interconnect of the integrated circuit to at least some of the plurality of processors, on each of the at least some of the plurality of processors, executing the received set of executable boot instructions to cause read requests to be issued to a memory external to the integrated circuit to fetch a set of executable application instructions; and executing the set of executable application instructions to perform operations using application data.

According to a fourth aspect, there is provide a computer program comprising computer executable instructions which when executed by processing circuitry of a hardware module of an integrated circuit comprising a plurality of processors cause a method to be carried out, the method comprising: storing in a hardware module of the integrated circuit, a set of executable boot instructions, causing the set of executable boot instructions to be dispatched over an interconnect of the integrated circuit to at least some of the plurality of processors, on each of the at least some of the plurality of processors, executing the received set of executable boot instructions to cause read requests to be issued to a memory external to the integrated circuit to fetch a set of executable application instructions; and executing the set of executable application instructions to perform operations using application data.

According to a fifth aspect, there is provided a non-transitory computer readable medium storing the computer program according to the fourth aspect.

BRIEF DESCRIPTION OF DRAWINGS

For a better understanding of the present invention and to show how the same may be carried into effect, reference will now be made by way of example to the accompanying Figures in which:

FIG. 2 is a schematic diagram illustrating the compute and exchange phases within a multi-tile processor.

DETAILED DESCRIPTION

Embodiments of the application relate to a new apparatus and method for securely distributing application instructions to processors of a processing unit. The processing unit is formed as part of an integrated circuit and comprises a plurality of processors (referred to as tiles), each having their own execution unit and storage for storing application data and executable application instructions. The integrated circuit comprises a hardware module (referred to herein as the autoloader) that is configured to distribute a set of bootloader instructions (referred to herein as a secondary bootloader) to each of at least some of the tiles. Each of the tiles then executes instructions of the received secondary bootloader, which causes each tile to issue read requests to read application instructions from a memory external to the integrated circuit. Each tile then performs operations on application data using the received application instructions so as execute the application. The application data includes variables that may be loaded by execution of the secondary bootloader or may be loaded by the execution of the application instructions themselves.

The secondary bootloader instructions and the software used to configure to processing circuitry of the autoloader to transfer the secondary bootloader instructions to the tiles are both trusted. By this it is meant that they may be relied upon to enforce a security policy, which in this case is the prevention of malicious code being loaded into the tiles. The system (which in the described embodiments is a host) from which the application instructions are loaded is untrusted and cannot be relied upon, without use of the trusted secondary bootloader, to provide the correct application instructions to the tiles.

Embodiments of the application may be implemented using the Intelligence Processing Unit (IPU) described in our earlier U.S. application Ser. No. 15/886,315, the contents of which are incorporated by reference. Each of these IPUs is formed on a single integrated circuit. However, the invention is not limited to an IPU and can be implemented in other types of processing unit.

Figure 1:
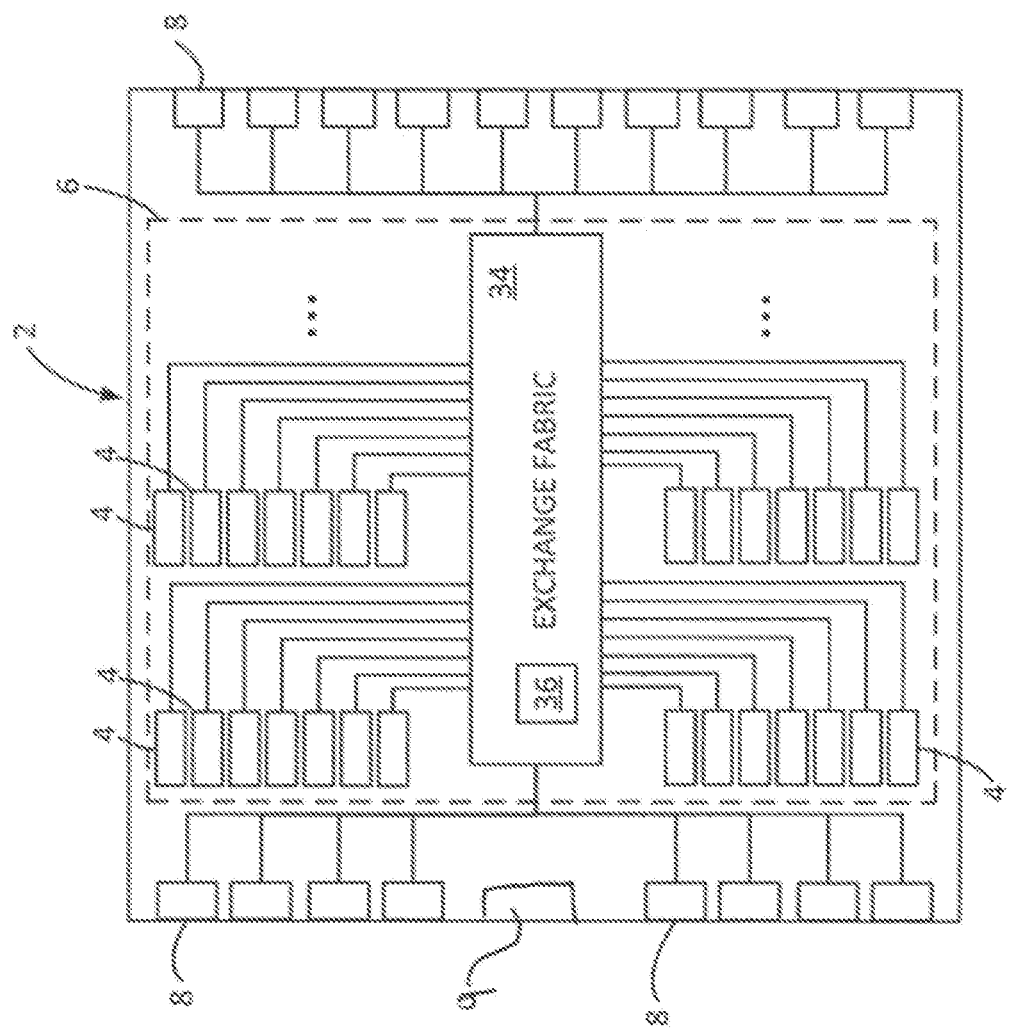
FIG. 1 is a schematic diagram of a multi-tile processor.

An example processing unit 2 is illustrated further in FIG. 1, which illustrates an example of a multi-tile processing unit 2. The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 also comprises one or more external links 8, enabling the processing unit 2 to be connected to one or more other processing units (e.g. one or more other instances of the same processing unit 2). These external links 8 may comprise any one or more of: one or more processor-to-host links for connecting the processing unit 2 to a host system, and/or one or more processor-to-processor links for connecting together with one or more other instances of the processing unit 2 on the same IC package or card, or on different cards. Multiple instances of the processing unit 2 can be connected together into cards by the processing unit-to-processing unit links. The processing unit 2 receives work from an external memory, which is connected to the processing unit 2, in the form of application data to be processed by the processing unit 2.

The interconnect 34 is configured to enable the different tiles 4 in the array 6 to communicate with one another. However, as well as there potentially being dependencies between threads on the same tile 4, there may also be dependencies between the portions of the program running on different tiles 4 in the array 6. A technique is therefore required to prevent a piece of code on one tile 4 running ahead of data upon which it is dependent being made available by another piece of code on another tile 4.

Communication between tiles 4 on the processing unit 2 occurs in a time deterministic fashion. However, other forms of inter tile exchange are possible. There may be dependencies between the portions of the program running on different tiles 4 in the array 6. That is, processing data on one tile 4 may depend on results from another tile 4, e.g. may provide results on which another tile depends. A technique is, therefore, required to prevent a piece of code on one tile 4 running ahead of data upon which it is dependent being made available by another piece of code on another tile 4.

Parallel programming models for AI and Data Science usually follows a 3-phase iterative execution model: Compute, Barrier, and Exchange. The implications are that data transfer to and from a processor is usually barrier dependent to provide data-consistency between the processors and between each processor and an external storage. Typically used data consistency models are Bulk Synchronous Parallel (BSP), Stale Synchronous Parallel (SSP) and Asynchronous. Embodiments described herein use a BSP model, but it will be apparent that the other sync models could be utilised as an alternative.

Figure 3:
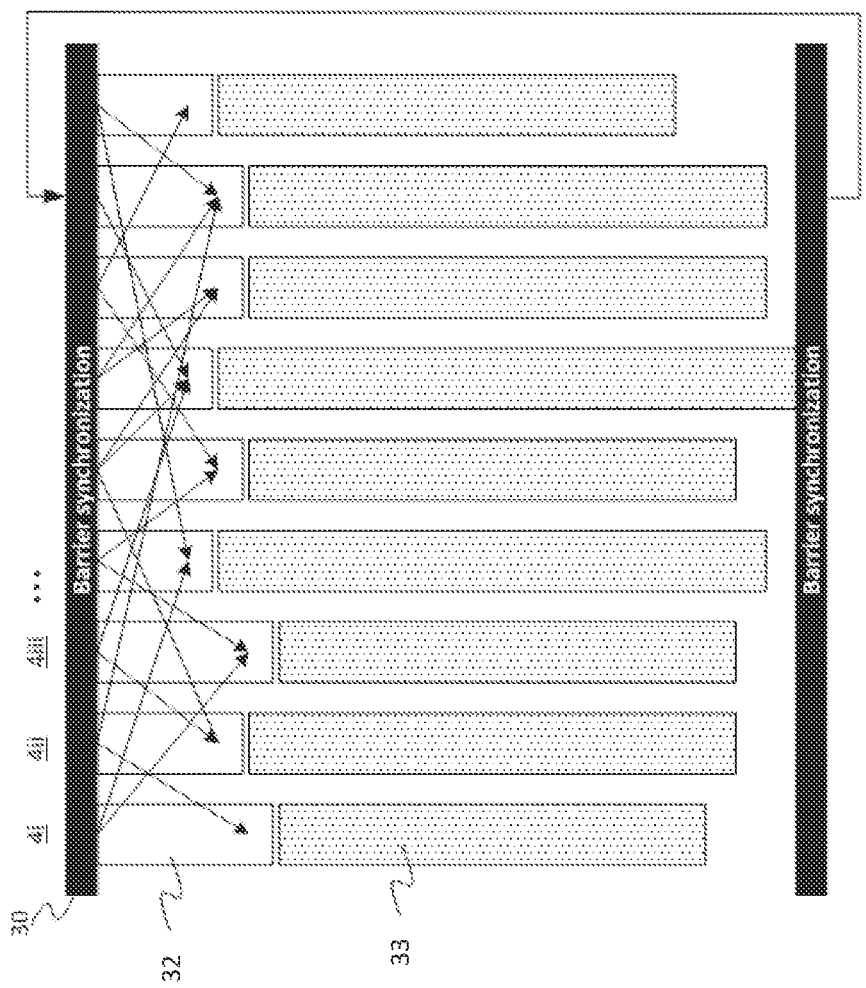
FIG. 3 illustrates exchange of data in a bulk synchronous parallel system.

Reference is made to FIGS. 2 and 3, which illustrate an implementation of a BSP exchange scheme in which each tile 4 performs a compute phase 33 and an exchange phase 32 in an alternating cycle, separated from one to the other by a barrier synchronization 30 between tiles. In the case illustrated by FIGS. 2 and 3, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles 4, but does not perform any new computations until it has received from other tiles 4 any data on which its task(s) has/have dependency. Neither does it send to any other tile 4, any data except that computed in the preceding compute phase. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same processing unit 2 or different processing units could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 3 illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that in this arrangement, some tiles 4 are allowed to begin computing 33 whilst some others are still exchanging.

The communication between tiles 4 of a processing unit 2 occurs in time deterministic fashion in which data packets are transmitted without headers. This is explained in our earlier application U.S. patent application Ser. No. 15/886,315.

Figure 4:
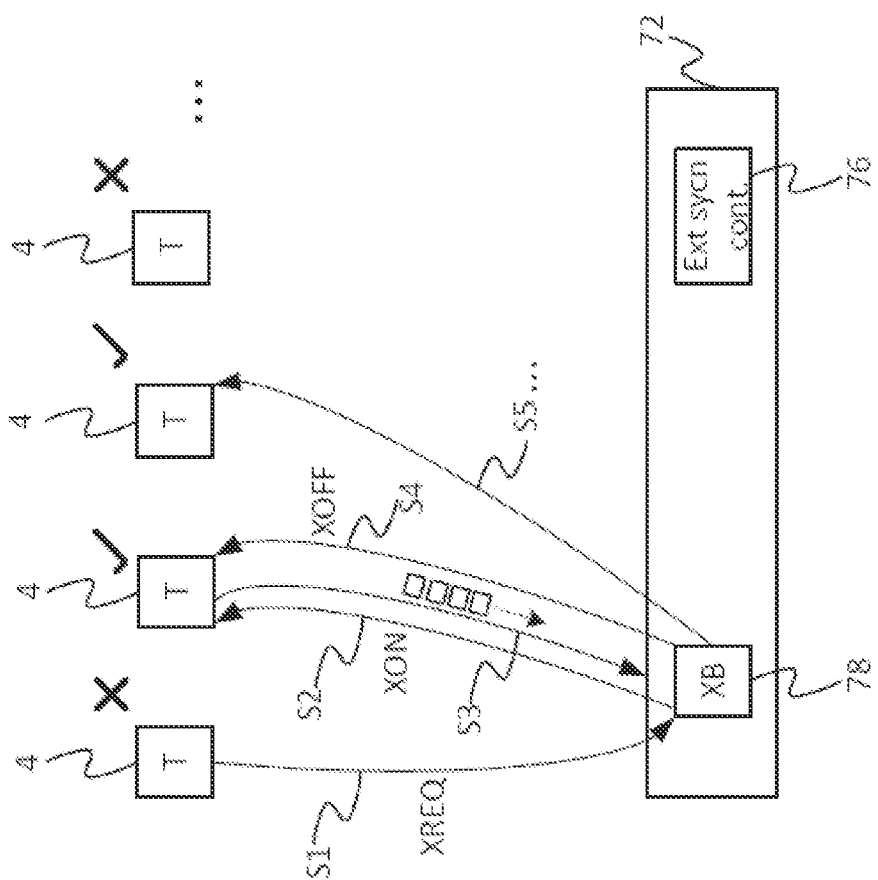
FIG. 4 illustrates an arrangement for sending data packets off chip from tiles.

FIG. 4 illustrates an exemplary mechanism for sending data packets from tiles to destinations external to the processing unit 2. This mechanism is non-time-deterministic. The mechanism is implemented in dedicated hardware logic in the external interconnect 72. Data is sent over the external interconnect 72 in the form of packets. Unlike the packets sent over the internal interconnect 34, these packets have headers: as the order of transmission can change, they require the destination address to be present in the packet header. The external interconnect 72 includes a routing table for statically routing the data packets between the different processors in dependence upon the headers of the data packets.

At the physical layer, the interconnect mechanism is lossy, but at the transaction layer, the mechanism is not lossy due to the architecture of the link layer: if a packet is not acknowledged it will be resent automatically by the hardware in the interconnect 72. The possibility for loss and resending at the data link layer, however, means that the delivery of data packets over the external interconnect 72 is not time-deterministic. Further, all the packets of a given exchange may arrive together or separated apart in time, and in any order, so the external interconnect requires flow control and queuing. Further, the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated, the external interconnect 72 comprises an external exchange block (XB) 78. The compiler nominates one of the tiles 4 to send an external exchange request (XREQ) to the exchange block 78 (operation S1). The XREQ is a message comprising one or more control packets, indicating which of the tiles 4 have data packets (content) to send. This is illustrated schematically in FIG. 4 by the ticks and crosses: by way of an example scenario, those labelled with a tick have data packets to send externally and those labelled with a cross do not. In operation S2, the exchange block 78 sends an exchange-on (XON) control packet to a first of the tiles 4 with data to send externally. This causes the first tile to start sending its packets to the relevant destination via the external interconnect 72 (operation S3). The data packets received from the first tile 4 at the external interconnect are statically routed to the destination using a routing table in the external interconnect 72. If at any time, the XB 78 is unable to continue sending packets to the interconnect (e.g. due to a previous packet loss and re-transmission in the interconnect, or due to over-subscription of the external interconnect by many other XBs and tiles) the XB 78 will send an exchange-off (XOFF) to that tile 4 before the XBs 78 queue overflows. Once the congestion is cleared and the XB 78 again has sufficient space in its queue it will send an XON to the tile 4 allowing it to continue transmitting its content. Once this tile 4 has sent its last data packet, then in operation S4 the exchange block 78 sends an exchange-off (XOFF) control packet to this tile 4, then in operation S5 sends another XON to the next tile 4 with data packets to send, and so forth. The signalling of XON and XOFF are implemented as a hardware mechanism in dedicated hardware logic in the form of the external exchange block 78.

Although in FIG. 4, only a single exchange block 78 is shown, there may be a plurality of different exchange blocks, with each of the exchange blocks serving a subset of the tiles 4 in the processing unit 2. In an implementation, for example, the integrated circuit in which the processing unit 2 is formed comprises eight exchange blocks, each of which performs the functions shown in FIG. 4 for one-eighth of the tiles 4 in the processing unit.

Figure 10:
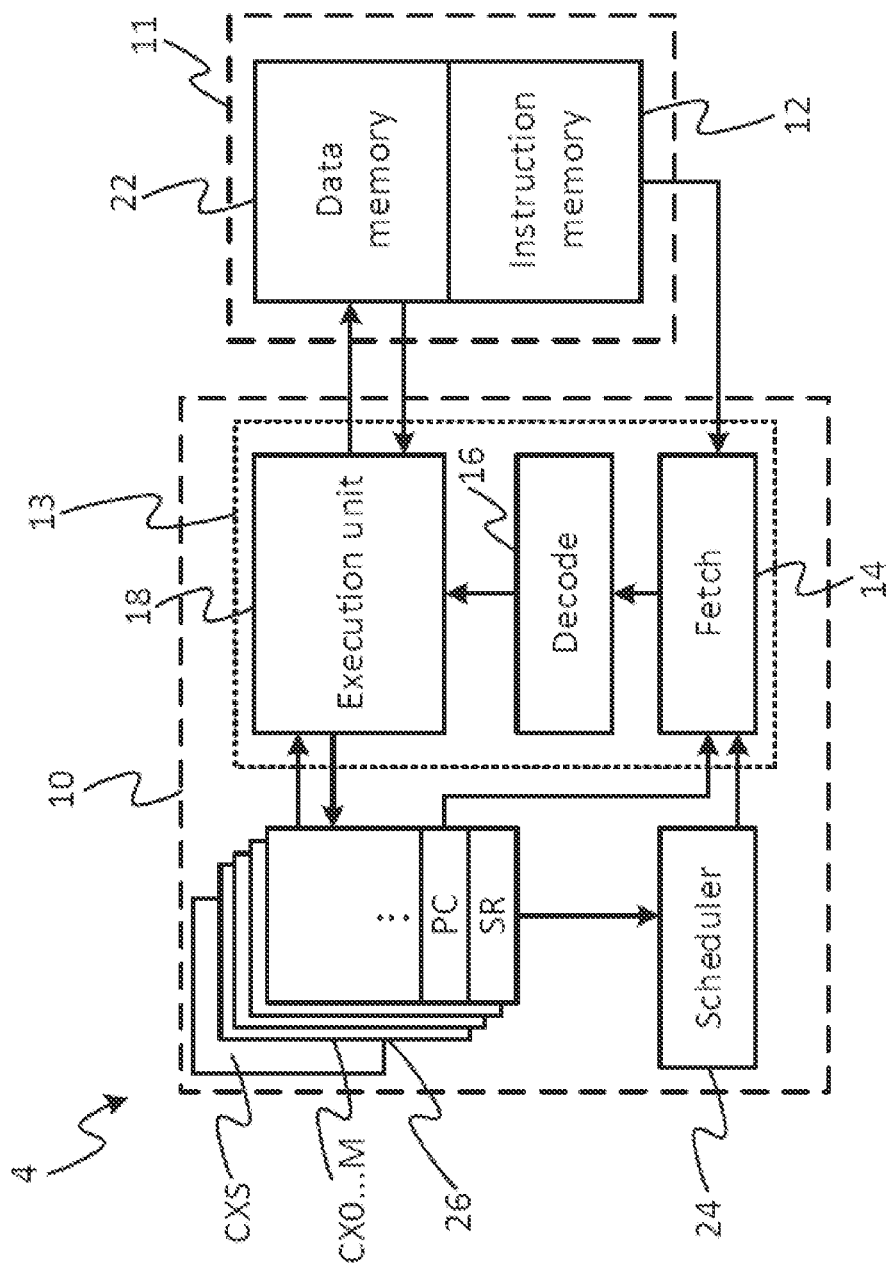
FIG. 10 is a schematic block diagram of an example processor.

Each of the processor tiles 4 comprises processing circuitry and memory. In some example embodiments, the processing circuitry is a multi-threaded processor 10. FIG. 10 illustrates an example of a processor tile 4 in accordance with embodiments of the present disclosure. The processor tile 4 comprises a multi-threaded processor 10 in the form of a barrel-threaded processor 10, and a local memory 11 (i.e. on the same tile in the case of a multi-tile array, or same chip in the case of a single-processor chip). A barrel-threaded processor 10 is a type of multi-threaded processor 10 in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

Within the processor 10, multiple different ones of the threads from the instruction memory 12 can be interleaved through a single execution pipeline 13 (though typically only a subset of the total threads stored in the instruction memory can be interleaved at any given point in the overall program). The multi-threaded processor 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processor 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

Figure 5A:
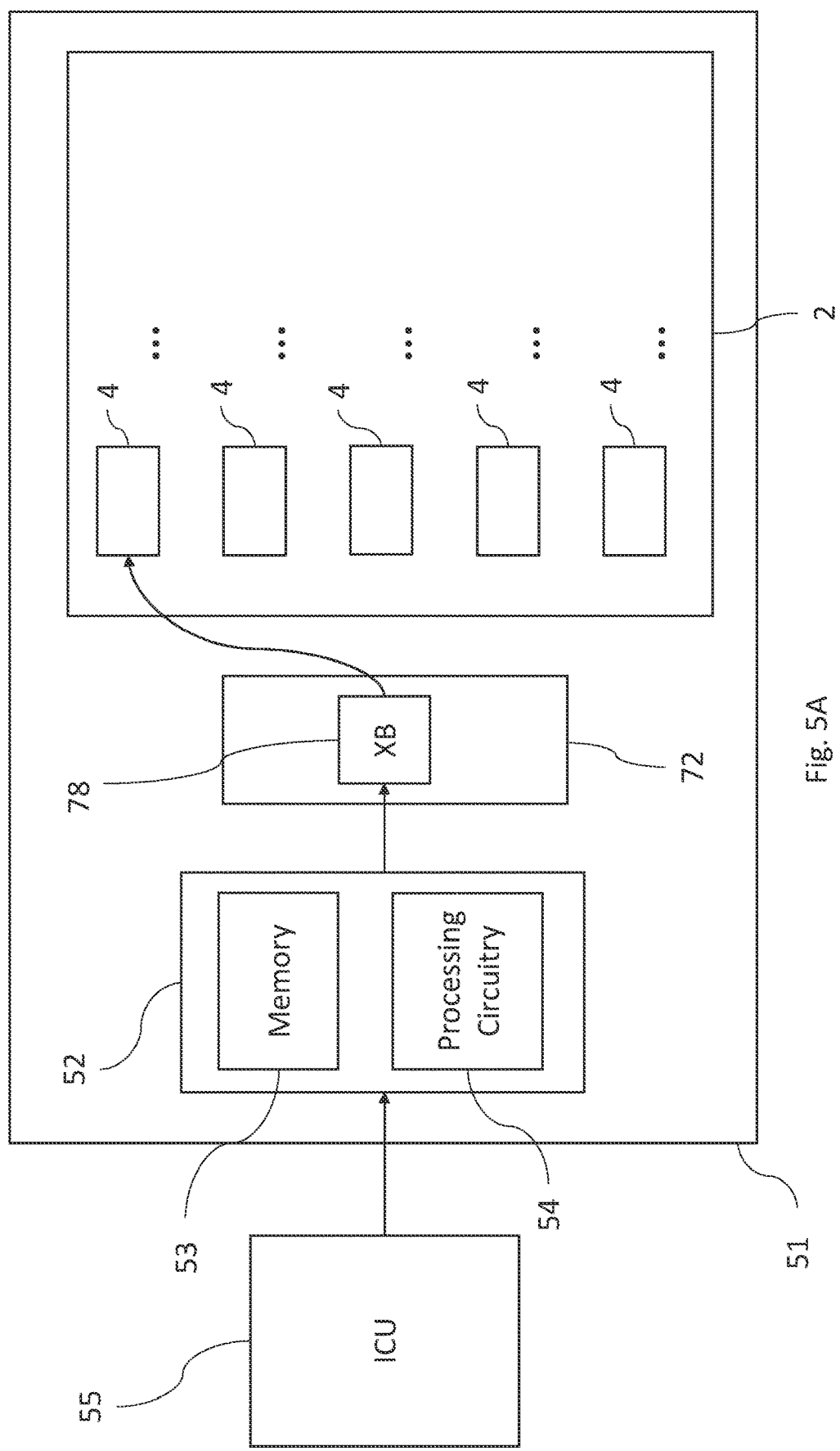
FIG. 5A illustrates the distribution of a secondary bootloader code to tiles of the chip according to an embodiment.

Reference is made to FIG. 5A, which illustrates an integrated circuit 51 in which a secondary bootloader code is distributed to a plurality of tiles 4 of the integrated circuit 51. The integrated circuit 51 comprises the processing unit 2 discussed above. The integrated circuit 51 also comprises a hardware module 52, which is referred to herein as the autoloader 52. The autoloader 52 is defined to be the primary bootloader for the integrated circuit 51. The autoloader 52 performs the functions of providing a secondary bootloader to a plurality of the tiles 4 and wiping remaining regions of tile memory.

The autoloader 52 comprises memory 53 that stores one or more sets of instructions that are executable by tiles 4 to fetch the application instructions from external storage. Each of the one or more sets of boot instructions is referred to as a secondary bootloader or a secondary bootloader image. The same secondary bootloader is loaded into a plurality of different tiles 4. In some cases, the same secondary bootloader may be loaded into all of the tiles 4 in the processing unit 2. In other cases, a first secondary bootloader may be loaded into a first set of the tiles 4, whilst one or further bootloaders are loaded to other tiles 4 in the processing unit 2. In some cases, some tiles 4 do not receive any secondary bootloader. The tiles 4 that do not receive any secondary bootloader will not fetch application instructions from external memory.

In order to deliver a secondary bootloader to one of the tiles 4, the processing circuitry 54 of the autoloader 52 loads the secondary bootloader from memory 53 and processes the secondary bootloader to produce one or more data packets. The one or more data packets contain the secondary bootloader code in the payload/s of the one or more packets. Each of the one or more data packets contain the identifier of the relevant tile 4 to which the secondary bootloader is to be dispatched in the header of the packet. The header also includes an address in tile memory indicating the location in the memory of the identified tile at which the secondary bootloader is to be written. The processing circuitry 54 causes the relevant one or more data packets to be dispatched over an interconnect of the integrated circuit 51 to an exchange block 78. The exchange block 78 converts the packets into an appropriate format for transmission over an interconnect of the processing unit 2 to the relevant tile 4. The exchange block 78 causes the one or more data packets to be dispatched to the tile 4 indicated in the address of the header/s. Upon receiving the one or more data packets, the processing circuitry of the tile 4 processes the data packets to extract the secondary bootloader code and store the secondary bootloader code in memory.

The autoloader 52 is configurable to write secondary bootloader code to different subsets of the tiles 4 in the integrated circuit 51. For example, the tiles 4 may be divided into 32 different subsets, with the autoloader 52 being programmed in a configuration register with the subsets to which it is to provide a secondary bootloader. When dispatched a secondary bootloader to a subset of tiles, the autoloader 52 may issue a write to each tile 4 in the subset of a first portion of the secondary bootloader to a location in memory of each tile 4 in the subset. The autoloader 52 then loops over the subset of tiles again, this time by writing to an incremented tile address. The autoloader 52 writes the second portion of the secondary bootloader to the next free location in memory of each tile 4 in the subset. The autoloader 52 continues in this way until the bootloader is written to all of the tiles 4 in the subset.

Figure 6:
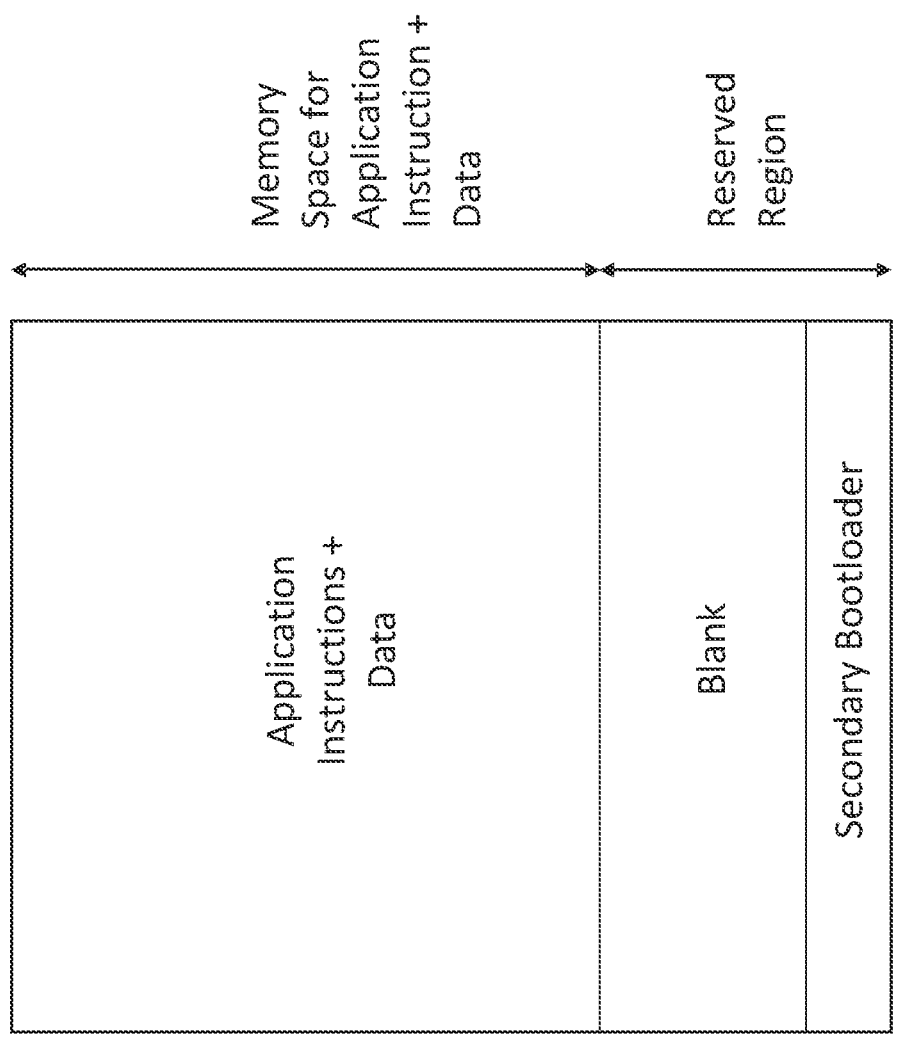
FIG. 6 illustrates an example of the layout of data in processor memory.

Reference is made to FIG. 6, which illustrates an example of the layout in tile memory 11 of the data and instructions fetched into memory 11. The memory 11 need not be a physically contiguous memory space. A first portion of the memory 11 is a reserved region. The secondary bootloader occupies a portion of the reserved region, with the remaining portion of the reserved region containing no data or code, i.e. being blank. In embodiments, the reserved region is 16 KB, with the secondary bootloader occupying approximately 1 KB of the reserved region. Other than the reserved region, the memory 11 comprises memory space that may be used for storing the application instructions and data retrieved from the external memory.

Following the writing of the secondary bootloader to the tiles 4, the autoloader 52 is then configured to clear the remaining tile memory 11. By resetting the tile memory 11 in this way, any data belonging to a previous tenant of the processing unit 2 that persists after a reset or power cycle will be removed. The autoloader 52 performs this clear by dispatching write packets to write to all of the tile memory space other than that occupied by the secondary bootloader code. The dispatched packets are the same type of packets that are dispatched by the autoloader 52 to write the secondary bootloader to the tile memory, but instead of including code of the secondary bootloader to be written to the tile memory 11, the packets include a sequence of zeros to be written to the locations in tile memory 11 indicated in the packet headers. Therefore, for each of the plurality of tiles 4 to which the secondary bootloader code is written, the autoloader 52 dispatches a series of packets to write zeroes to the other locations in tile memory 11 that do not include the secondary bootloader.

As noted, a secondary bootloader may not be written to every tile 4 in the processing unit 2. Therefore, for those tiles 4 to which the secondary bootloader is not written, the autoloader 52 writes zeroes to all of the tile memory 11. These tile 4 for which the entire memory 11 is blank, will not be used during the processing of the application.

The clearing of tile memory 11 that is performed by the autoloader 52 causes each of the tiles 4 that received a secondary bootloader to begin executing that secondary bootloader.

In the embodiment illustrated in FIG. 5A, the autoloader 52 receives the one or more secondary bootloaders from a device 55 external to the integrated circuit 51. The device 55 is referred to herein as an intelligent cryptographic unit (ICU). The ICU 55 comprises or is associated with a non-volatile memory, such as a flash memory. The autoloader memory 53, on the other hand, is volatile memory, such as SRAM. Therefore, the non-volatile memory associated with the ICU 55 stores the one or more secondary bootloaders, such that the secondary bootloader/s can be made available to the tiles 4 after power down and restart of the integrated circuit 51. Upon restart of the integrated circuit 51, the ICU 55 provides the one or more secondary bootloaders to the autoloader 52 of the integrated circuit 51. The ICU 55 makes successive writes over an interface to provide the one or more secondary bootloaders to the integrated circuit 51. The ICU 55 provides the one or more secondary bootloaders to the autoloader 52 via a JTAG interface of the integrated circuit 51. The one or more secondary bootloaders are then stored in the volatile memory 53 of the autoloader 52 prior to being provided to the tiles 4.

The interface over which the ICU 55 provides the writes of the second bootloader code to the memory 53 is high latency when compared to the on-chip interconnect over which the autoloader 52 is able to write to memory of the tiles 4. It would therefore be slow for the ICC 55 itself to individually write bootloader code to each of the tiles 4. Substantial efficiency gains are achieved by the ICU 55 writing bootloader code to the autoloader 52, and the autoloader then providing that bootloader code to a plurality of different tiles 4 over the high speed on-chip interconnect.

Figure 5B:
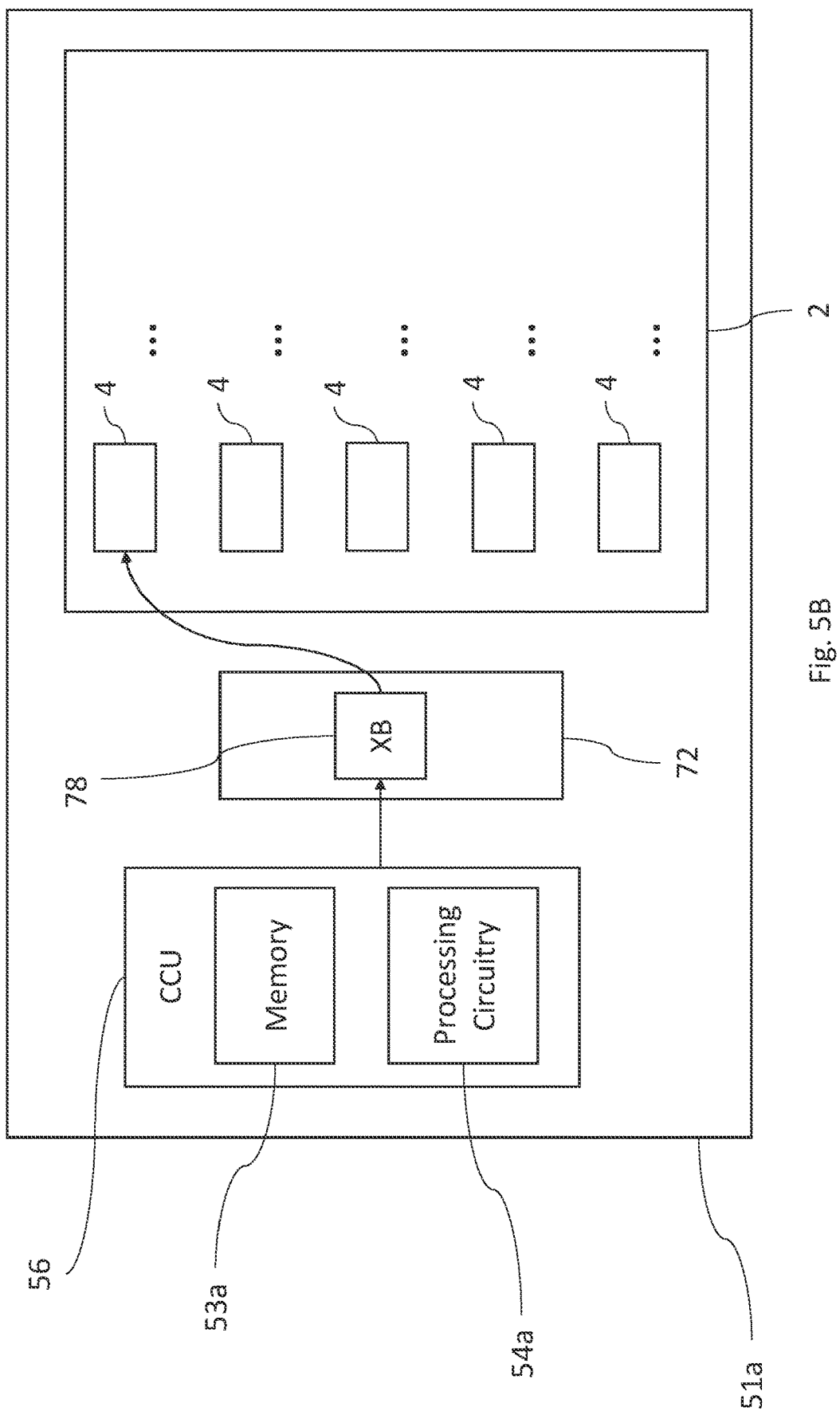
FIG. 5B illustrates the distribution of a secondary bootloader code to tiles of the chip according to a further embodiment.

Reference is made to FIG. 5B, which illustrates an alternative example of an integrated circuit 51*a*. In this case, the integrated circuit 51*a* comprises a CCU 56. The CCU 56 functions as an autoloader and comprises memory 53*a* and processing circuitry 54*a*. The memory 53*a* performs the same functions discussed above for memory 53, i.e. memory 53*a* stores the secondary bootloader to be distributed to a plurality of the tiles 4. The processing circuitry 54*a* performs the same functions discussed above for processing circuitry 54, including executing instructions to cause the secondary bootloader to be distributed to the plurality of the tiles 4 and clearing tile memory. The processing circuitry 54*a* is configured by trusted software to issue the write requests to write the secondary bootloader to the memory of the tiles 4. The memory 53*a* comprises a non-volatile memory 53*a* that is configured to store the second bootloader, such that the secondary bootloader code will not be lost from the memory 53*a* when the integrated circuit 51*a* is powered down. Therefore, in this embodiment, there is no requirement for an external device, such as the ICU 55 to store the secondary bootloader code and provide it to the integrated circuit 51*a*.

The other elements shown in FIG. 5B operate in the same manner as the corresponding elements shown in FIG. 5A.

Figure 7:
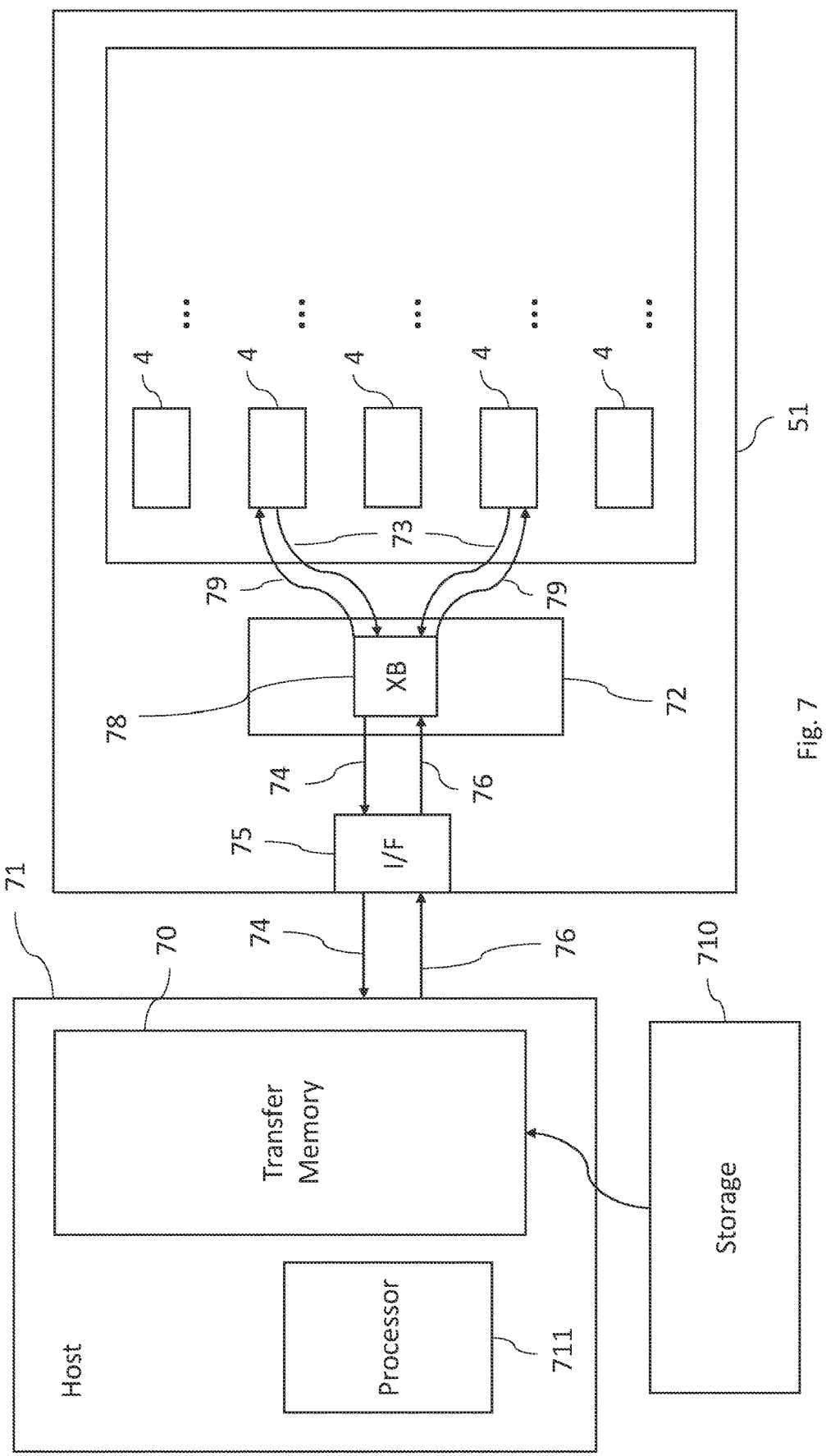
FIG. 7 illustrates the propagation of sync requests and acknowledgments.
Figure 8:
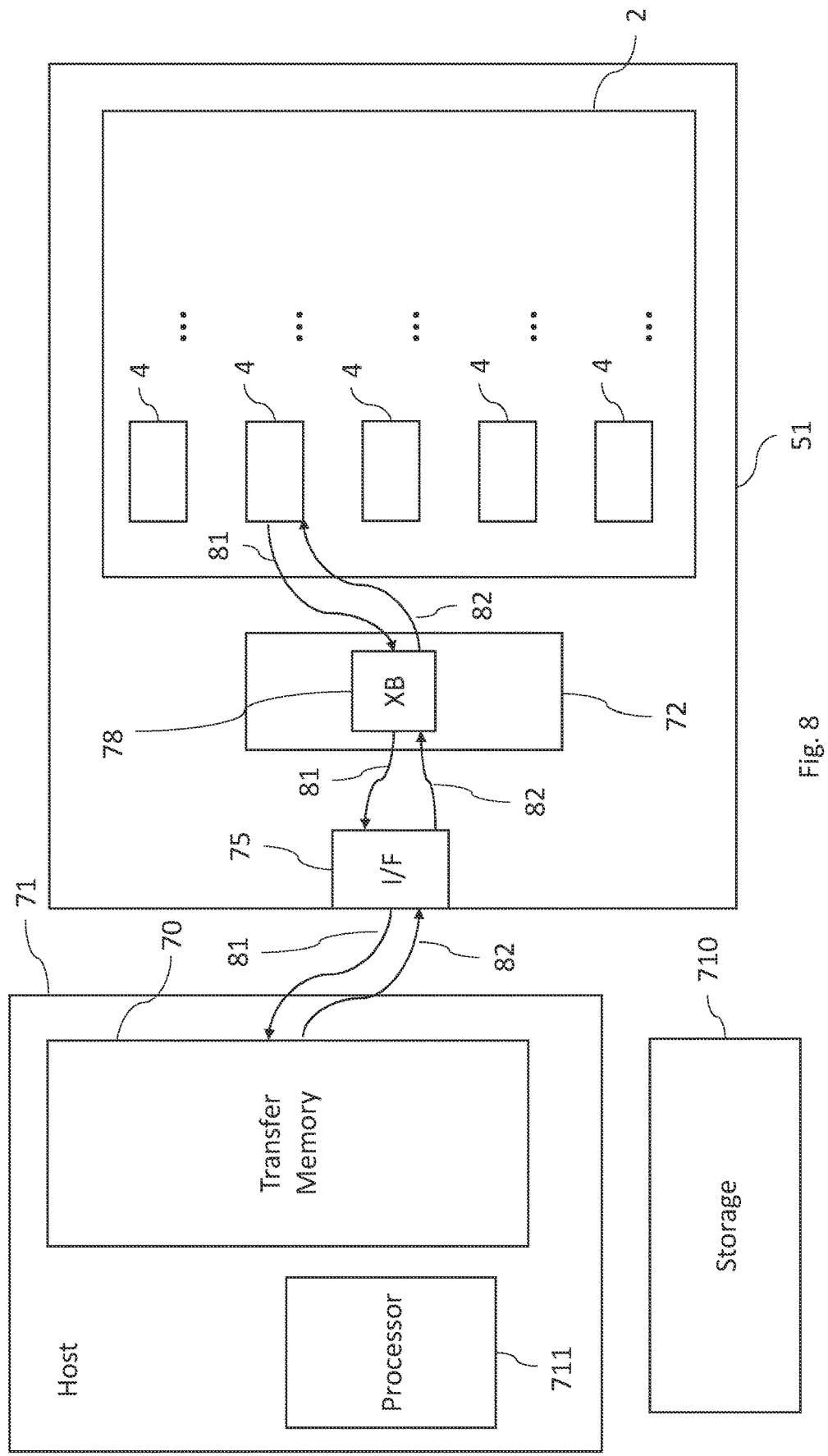
FIG. 8 illustrates the reading of application data by the tiles from an external memory.

Reference is made to FIGS. 7 and 8, which illustrates how, once the secondary bootloader has been written to a plurality of the tiles 4, the application instructions are retrieved from the external memory 70.

The external memory 70 is shown as being part of a host system 71 in this example. However, in other examples, the system 71 could be a gateway that interfaces the integrated circuit 51 with a host system. The system 71 could be another type of system comprising external memory 70.

The system 71 includes at least one processor 711 for loading the application instructions from memory 70. The at least one processor 711 may be a processor that is configured to execute compute readable instructions.

The tiles 4 comprising a secondary bootloader are divided into different sync groups that will each retrieve their application instructions during separate exchange phases. There may be four different sync groups for all of the tiles 4 in the integrated circuit 51. There are different ways in which a tile 4 may identify the sync group to which it belongs. In some cases, different secondary bootloader code may be dispatched to tiles 4 belonging to different sync groups. In other cases, the same secondary bootloader code may be dispatched to tiles belonging to different sync groups, but the secondary bootloader code when executing on each tile 4 uses the tile ID of the tile 4 to determine which sync group the tile 4 belongs to.

The tiles 4 of a first sync group of tiles 4 each issues a sync request 73 to the exchange block 78. Each sync request 73 includes or is preceded by an indication of the sync group to which the tile 4 from which the request was issued belongs. The exchange block 78 stores an indication of the number of sync requests 73 expected for that sync group. The exchange block 78 receives the sync requests 73 and determines when it is has received the number of expected sync requests 73 for that sync group. Once it has received the number of expected sync request 73, the exchange block aggregates these sync requests into a sync request 74 that is sent via an interface 75. The interface 75 converts the received sync requests, which are in the form of packets for transmission over interconnects of the integrated circuit 51, to PCIe packets for transmission to the system 71.

Upon receiving the sync request 74, the system 71 loads the application instructions into memory 70 for delivery to the tiles 4 belong to the sync group that issued the sync requests 73. The sync request 74 contains an indication of the sync group to which it relates. The system 71, in dependence upon the indication of the sync group, loads the application instructions required by the tiles 4 of that sync group into the memory 70. The instructions are loaded into memory 70 from storage 710. The storage 710 could be part of the data provision system 71 or could be separate to the system 71. The memory 70 may, therefore, be understood to be a data transfer memory, into which instructions are pre-loaded prior to being fetched by the relevant tiles 4.

The memory 70 is arranged into a plurality of different address spaces or buffers from which data are read by the tiles. Each of these address spaces corresponds to a different stream of data which is read by the tiles. The address spaces need not be contiguous memory spaces, but could be virtual buffers.

Once the loading into the memory 70 of the application instructions for transfer to a tile 4 is complete, the system 71 issues a sync acknowledgment 76, which is returned to the exchange block 78. The exchange block 78, in response to receiving the sync acknowledgment 76, dispatches sync acknowledgments 79 to all of the tiles 4 in the sync group.

Reference is made to FIG. 8, which illustrates the steps that take place after the return of the sync acknowledgments 79 to the tiles 4 of the processing unit 2. Following receipt of a sync acknowledgement, each tile 4 awaits receipt of control from the exchange block 78 so as to send read request packets. This happens in accordance with the description given above with respect to FIG. 4. Each of the tiles 4 in the sync group dispatches a read request 81 to the exchange block 78. For simplicity of illustration, in FIG. 8, only one read request 81 is shown originating from one tile 4. The exchange block 78 passes the read request 81 to the interface 75. The read request 81 is converted by the interface 75 into a PCIe read request. The interface 75 passes the read request 81 to the system 71. Each read request 81 comprises an indication of the address in memory 70, which it is targeting. A processor of the system 71 in response to a read request 81, produces one or more data packets 82 comprising data read from memory 70 at the location indicated in the read request 81. These one or more generated data packets 82 are referred to as read completions. The one or more read completions 82 are returned by the system 71 to the integrated circuit 51. The one or more read completions 82 are received at the exchange block 78, which provides the read completions to the tile 4 from which the read request 81 originated. Control then passes to the next tile 4 in the sync group, which issues its read request to read from a certain location in memory 70 and then receives one or more completions in response.

After each tile 4 in the sync group has read its application instructions from memory 70, the tiles 4 of another sync group will then issues sync requests, which are aggregated by an exchange block and provided to the system 71. The system 71, in response to receiving this next sync request, will load the relevant application instructions into memory 70 for delivery to the tiles 4 of the corresponding sync group. The system 71 then returns a sync acknowledgment to the integrated circuit 51, which causes the tiles 4 of the sync group to issue the read requests to read from the memory 70.

The process of sync request/acknowledgment and reading from memory 70 continues until all of the tiles 4 having a secondary bootloader have loaded their application instructions from memory 70.

Each of the tiles 4 that loads application instructions from memory 70 determines the address from which to read using the tile identifier (tile ID) of the tile 4 that is stored in storage (different to memory 11) in the tile 4. Since a plurality of the tiles 4 receive the same secondary bootloader, the secondary bootloader is configured to load the instructions from a location in the memory 70 that depends upon the tile ID. The secondary bootloader calculates the address from which to read from memory 70 in dependence upon the ID of the tile on which it runs.

As noted, the application instructions are executed by the tiles to perform operations using application data, e.g. variables. This application data may be loaded into the tiles 4 at the same time and in the same manner as the application instructions, i.e. by executing the secondary bootloader instructions to issue read requests to load data from the memory 70 of the host 71. Additionally or alternatively, application data may be loaded by the tiles 4 executing the application instructions themselves to issue read requests load the application data from the memory 70 of the host 71. In particular, the secondary bootloader instructions may be used to issue read requests to load the invariant parts of the application data, e.g. hyperparameters for a machine learning model, whereas the application instructions may be used to issue read requests to load the variant parts of the data, e.g. training data for a machine learning model.

During runtime of the application, it may be desirable to checkpoint certain data that can be read back into the tiles 4 should the application running on the processing unit 2 fail and need to be restarted from a certain point. The secondary bootloader may be used to load checkpoint data.

When the application is running on the processing unit 2, some of the application data held in tile memory 11 is modified. The application data held in tile memory 11 is divided into variant data and invariant data. The variant data comprises the variables that are modified during runtime of the application, such as the weights of the neural network. The invariant data comprises data that doesn't change during running of the application, such as data defining which nodes in a neural network are connected.

To perform a checkpoint of the application, groups of tiles issue sync requests in a similar manner to as shown in FIG. 7 before issuing writes to write data to the system 51. The tiles 4 of the processing unit 2 issue writes containing the variant data that they have generated during execution.

Figure 9:
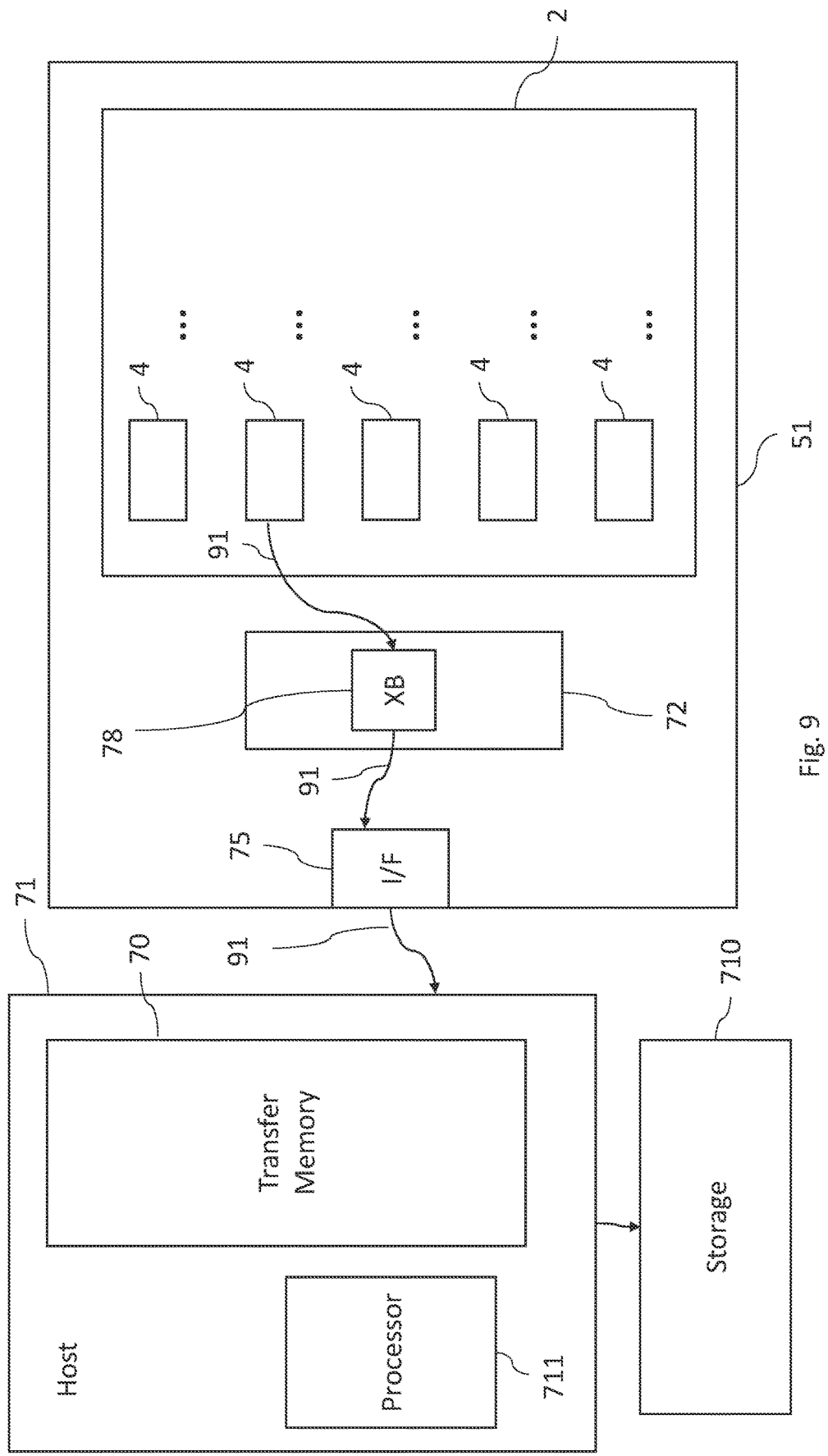
FIG. 9 illustrates the checkpointing of application data by the tiles.

Reference is made to FIG. 9, which illustrates the writing of checkpoint data by a tile 4 of the integrated circuit 51 to the storage 70 accessible by the system 71. A write 91 comprises one or more data packets 91 issued by a tile 4. The one or more data packets 91 contain the checkpoint data to be written to the storage 710. The write is provided to the system 71. The at least one processor 711 of the system 71 causes the checkpoint data to be written to storage 710. The checkpoint data is identified as being associated with the tile 4 from which the write was received. Other tiles 4 of the integrated circuit 51 will likewise provides writes of their variant data, which are written to storage 710.

At a later time, when the tiles 4 of the integrated circuit 51 require to load the checkpointed data (e.g. because of a failure in running the application), a secondary bootloader is loaded to those tiles 4 by the autoloader as discussed above with respect to FIGS. 5A/5B. The remaining areas of tile memory are wiped as discussed. The tiles 4 then issue sync requests which are aggregated and provided to the system 71. In response to receipt of a sync request, the system 71 causes the application data to be loaded from storage 710 to memory 70. Unlike when starting the application initially, the loading of the application data from storage 710 in this case includes loading of the checkpoint data that was written by the tiles 4. The application data loaded into memory 70 includes both the checkpoint data, which is the variant data written by the tiles 4 to the storage 710, and additionally includes the invariant data that was previously loaded. The system 71 causes the application data to be arranged in memory 70 in the same layout as used for the initial application data loaded into memory 70. Therefore, the same secondary bootloader used by a tile 4 to load the initial application data, may also be used to load the application data including the checkpoint data. In some cases, if required, the secondary bootloader used for loading the checkpointed application data may differ from the secondary bootloader used for initially loading the application instructions.

Once the system 71 has loaded the application data including checkpoint data into the memory 70, the system 71 sends an acknowledgement that is sent to the tiles 4 that issued the sync requests. The tiles 4 then issue read requests to the memory 70, to read the application data including the checkpoint data from the memory 70. This reading of the application data including checkpoint data is carried out using the same mechanism for the initial reading of the application instructions as discussed above with respect to FIG. 8.

Once the tiles 4 have read in the data including the checkpoint data, they once again begin executing the application from the point at which the checkpoint was taken.

Figure 11:
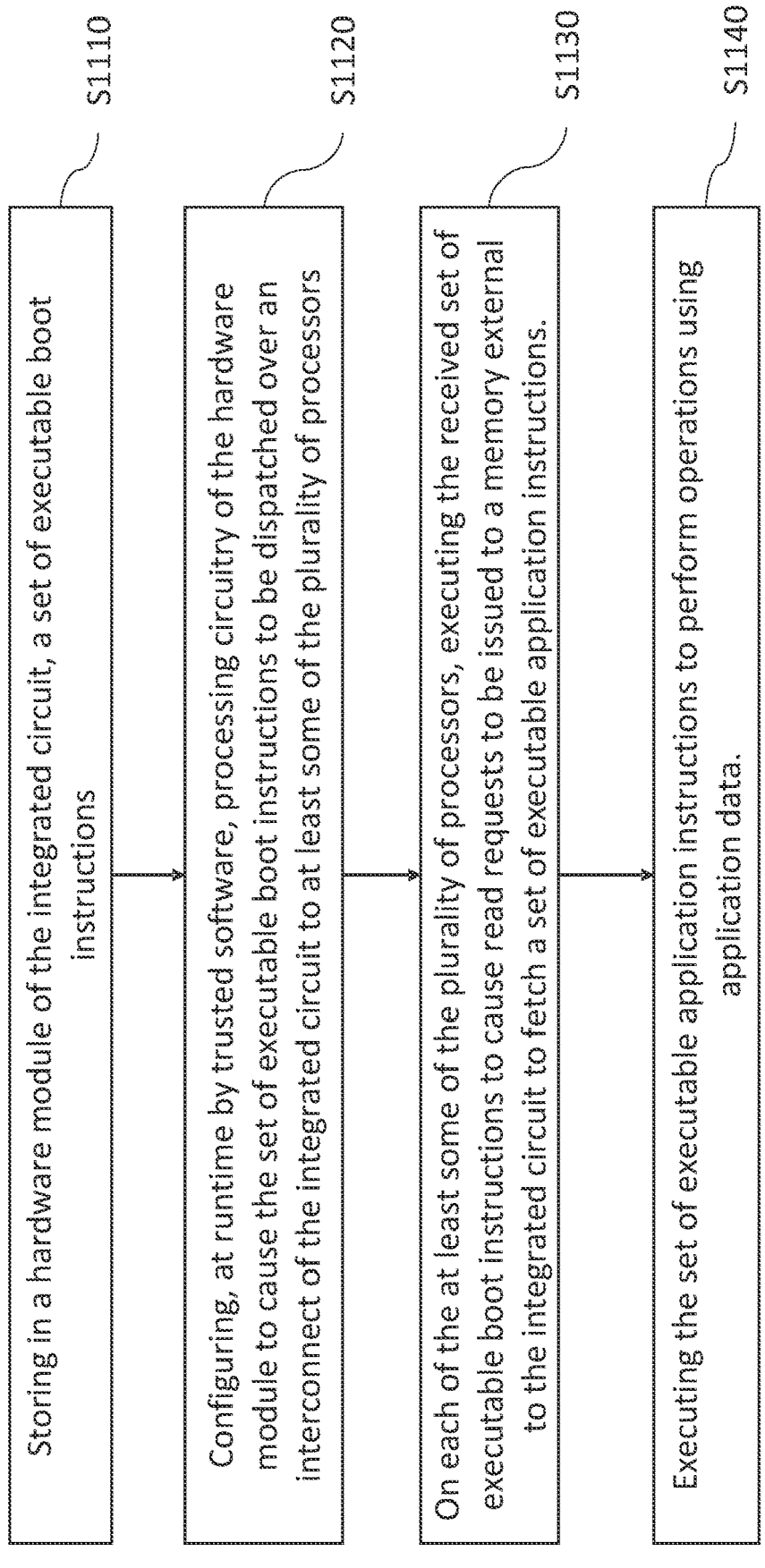
FIG. 11 illustrates an example method according to embodiments of the application.

Reference is made to FIG. 11, which illustrates a method 1100 according to embodiments of the application. The method 1100 is implemented in an integrated circuit comprising a plurality of processors At S1110, a hardware module of the integrated circuit stores a set of executable boot instructions.

At S1120, processing circuitry of the hardware module is configured at runtime by trusted software to cause the set of executable boot instructions to be dispatched over an interconnect of the integrated circuit to at least some of the plurality of processors.

At S1130, each of the at least some of the plurality of processors execute the received set of executable boot instructions to cause read requests to be issued to a memory external to the integrated circuit to fetch a set of executable application instructions.

At S1140, each of the at least some of the plurality of processors execute the set of executable application instructions to perform operations using application data.

It will be appreciated that the above embodiments have been described by way of example only.

The invention claimed is:

1. A single chip integrated circuit comprising a plurality of processors, each of the plurality of processors comprising:
   at least one memory for storing application data and a set of executable application instructions; and
   at least one execution unit,
   wherein the integrated circuit further comprises an on chip hardware module comprising volatile memory and processing circuitry, wherein the processing circuitry of the hardware module is configured to, following a reset of the integrated circuit:
      receive a set of executable boot instructions from a device external to the integrated circuit via an external link; and
      store the set of executable boot instructions in the volatile memory,
wherein the processing circuitry of the hardware module is configured at runtime by trusted software to cause the set of executable boot instructions which have been received over the external link to be dispatched over an on chip interconnect of the integrated circuit to at least some of the plurality of processors, the external link having a higher latency than the on chip interconnect,
   wherein the processing circuitry of the hardware module is configured to produce one or more data packets to be dispatched over the on chip interconnect, each data packet containing at least a portion of the set of executable boot instructions and an identifier of the corresponding processor to which the portion of executable boot instructions is to be dispatched, and
   wherein for each of the at least some of the plurality of processors, the respective at least one execution unit is configured to:
      execute the set of executable boot instructions to cause read requests to be issued to at least one memory external to the integrated circuit to fetch the set of executable application instructions; and
      execute the set of executable application instructions to perform operations using the application data.

2. The integrated circuit of claim 1, wherein for each of the at least some of the plurality of processors:
   executing the set of executable boot instructions comprising calculating an address of the external memory in dependence upon an identifier of the respective processor in the integrated circuit,
   the causing the read requests to be issued comprises causing the read requests to be issued to fetch the set of executable application instructions from the calculated address in the external memory.

3. The integrated circuit of claim 1, wherein the hardware module comprises processing circuitry configured to cause one or more write requests to be dispatched to each of the at least some of the plurality of processors to cause memory space not occupied by the set of executable boot instructions to be cleared.

4. The integrated circuit of claim 1, wherein for each of the at least some of the plurality of processors:
   the respective at least one execution unit is arranged to cause checkpoint data generated during execution of the respective set of executable application instructions to be dispatched in write requests to a storage.

5. The integrated circuit of claim 4, wherein the processing circuitry of the hardware module is configured to, following the causing the checkpoint data to be dispatched, cause the set of executable boot instructions to again be dispatched over an interconnect of the integrated circuit to at least some of the plurality of processors,
   wherein for each of the at least some of the plurality of processors, the respective at least one execution unit is configured to subsequently:
      execute the set of executable boot instructions to cause read requests to be issued to fetch the set of executable application instructions and a further set of application data including the checkpoint data; and
      execute the set of executable application instructions to perform operations using values of the checkpoint data.

6. The integrated circuit of claim 5, wherein the further set of application data comprises a set of invariant data, wherein the invariant data is part of the application data fetched prior to dispatch of the checkpoint data,
   wherein the further set of application data comprises the checkpoint data in place of variant data that is part of the application data fetched prior to dispatch of the checkpoint data.

7. The integrated circuit of claim 1, wherein for each of the at least some of the plurality of processors, the respective at least one execution unit is configured to execute the respective set of executable application instructions to load at least part of the application data from the at least one memory external to the integrated circuit.

8. The integrated circuit of claim 1, wherein for each of the at least some of the plurality of processors, the respective at least one execution unit is configured to execute the set of executable boot instructions to cause read requests to be issued to at least one memory external to the integrated circuit to fetch at least part of the application data.

9. The integrated circuit of claim 1, wherein the receiving the set of executable boot instructions from the device external to the integrated circuit comprises receiving the set of executable boot instructions via a Joint Test Action Group (JTAG) interface.

10. The integrated circuit of claim 1, wherein the memory of the hardware module is configured to store a plurality of sets of executable boot instructions, wherein the processing circuitry is configured to cause each of the plurality of sets of executable boot instruction to be dispatched to a subset of the processors of the integrated circuit.

11. The integrated circuit of claim 1, implemented as part of a data processing system that includes a data provision system having the memory external to the integrated circuit.

12. The integrated circuit of claim 11, wherein the data provision system comprises at least one processor configured to, in response to receipt at the data provision system of a sync request from the integrated circuit, cause application data for a group of the processors to be loaded into the memory external to the integrated circuit.

13. The integrated circuit of claim 11, wherein at least one processor of the data provision system is configured to arrange the application data in the memory external to the integrated circuit in an arrangement depending upon an identifier of a group of the processors received from the integrated circuit.

14. A method implemented in a single chip integrated circuit having a plurality of processors, the method comprising:
   storing executable boot instructions in an on chip hardware module of the integrated circuit, wherein the hardware module comprises a volatile memory configured to store the executable boot instructions;
   following a reset of the integrated circuit:
   receiving the executable boot instructions from a device external to the integrated circuit via an external link; and
   storing the executable boot instructions in the volatile memory;
   configuring, at runtime by trusted software, processing circuitry of the hardware module to produce one or more data packets to be dispatched over an on chip interconnect of the integrated circuit to at least some of the plurality of processors each data packet containing at least a portion of the executable boot instructions which have been received over the external link and an identifier of the corresponding processor to which the portion of executable boot instructions is to be dispatched, the external link having a higher latency than the on chip interconnect;
   executing the executable boot instructions, by a first processor, to cause a read request to be issued to a memory external to the integrated circuit to fetch executable application instructions; and
   executing the executable application instructions to perform operations using application data.

15. The method of claim 14, wherein executing the executable boot instructions includes:
   calculating an address of the memory in dependence upon an identifier of the first processor, and
   wherein causing the read request to be issued comprises fetching the executable application instructions from the calculated address in the memory.

16. The method of claim 14, further comprising:
   causing a write request to be dispatched to the first processor to cause memory space not occupied by the executable boot instructions to be cleared.

17. The method of claim 14, further comprising:
   causing checkpoint data generated during execution of the executable application instructions to be dispatched in write requests to a storage.

18. The method of claim 17, further comprising:
   following the checkpoint data being dispatched, causing further executable boot instructions to be dispatched over the interconnect to a second processor of the plurality of processors,
   the method further comprising the second processor performing the following actions:
   executing the further executable boot instructions to cause read requests to be issued to fetch further executable application instructions and further application data including the checkpoint data; and
   executing the further executable application instructions to perform operations using values of the checkpoint data.

19. The method of claim 14, wherein executing the executable application instructions includes loading at least part of the application data from storage external to the integrated circuit.

20. The method of claim 14, wherein executing the executable boot instructions includes causing a further read request to be issued to storage external to the integrated circuit to fetch at least part of the application data.

21. The method of claim 14, wherein the executable boot instructions are received via a Joint Test Action Group (JTAG) interface.

22. A non-transitory computer readable storing a computer program comprising computer executable instructions which when executed by processing circuitry of a hardware module of a single chip integrated circuit comprising a plurality of processors causes a method to be carried out, the method comprising:
   storing a set of executable boot instructions in an on chip hardware module of the integrated circuit, wherein the hardware module comprises a volatile memory configured to store the executable boot instructions;
   following a reset of the integrated circuit:
   receiving the executable boot instructions from a device external to the integrated circuit via an external link; and
   storing the executable boot instructions in the volatile memory;
   configuring, at runtime by trusted software, processing circuitry of the hardware module to produce one or more data packets to be dispatched over an on chip interconnect of the integrated circuit to at least some of the plurality of processors, each data packet containing at least a portion of the set of executable boot instructions which have been received over the external link and an identifier of the corresponding processor to which the portion of executable boot instructions is to be dispatched, the external link having a higher latency than the on chip interconnect;
   executing the set of executable boot instructions to cause a read request to be issued to a memory external to the integrated circuit to fetch executable application instructions; and
   executing the executable application instructions to perform operations using application data.

* * * * *